Sept. 20, 1927.  W. W. BURNWATT  1,643,268
FOLDING TRUCK
Filed July 10, 1926
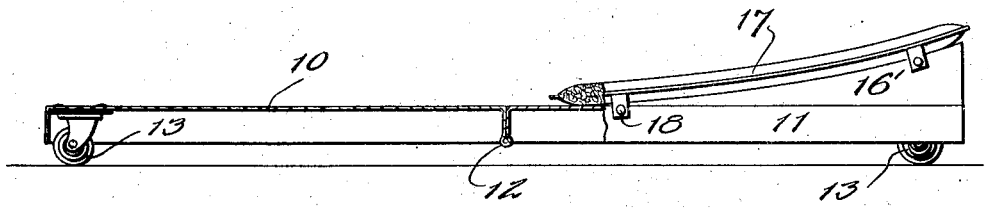
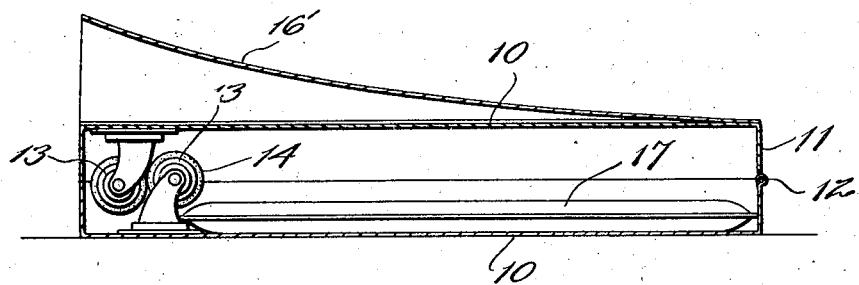
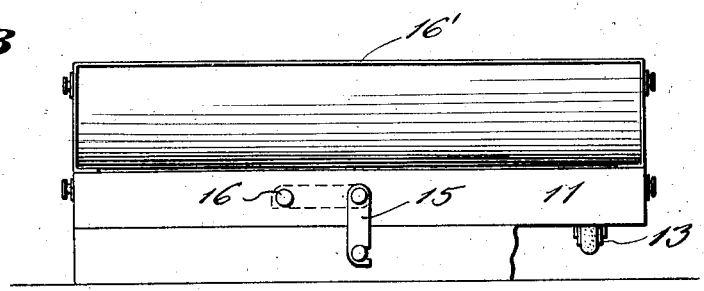
William W. Burnwatt
INVENTOR
BY Victor J. Evans
ATTORNEY
WITNESS:

Patented Sept. 20, 1927.

1,643,268

UNITED STATES PATENT OFFICE.

WILLIAM W. BURNWATT, OF LOS ANGELES, CALIFORNIA, ASSIGNOR OF ONE-HALF TO WILLIAM MAX FEARON, OF LOS ANGELES, CALIFORNIA.

FOLDING TRUCK.

Application filed July 10, 1926. Serial No. 121,621.

This invention relates to improvements in trucks and has especial relation to dolly trucks, or "creepers" used when working beneath an automobile.

An object of the invention is to provide a foldable truck of this character which is simple, light and durable in construction, may be conveniently and compactly folded so as to be carried in an automobile, and in which the truck supporting casters or rollers are utilized to provide means for yieldingly holding the truck folded.

With the above and other objects in view, the invention further includes the following novel features and details of construction, to be hereinafter more fully described, illustrated in the accompanying drawings and pointed out in the appended claims.

In the drawings:—

Figure 1 is a view partly in section and partly in elevation showing the truck sections extended.

Figure 2 is an enlarged sectional view with the truck sections folded.

Figure 3 is an end view with the sections folded and showing a different form of fastening means.

Referring to the drawings in detail wherein like characters of reference denote corresponding parts, the truck is shown as comprising separate sections, each of which is indicated at 10. These sections may be formed of suitable material, but it is preferred to form them of sheet metal with flanges 11 extending around their marginal edges. The sections may thus be formed of relatively thin material as the flanges will act as a reinforcement. If desired, the metal may be corrugated as a further strengthening means. The sections 10 are hingedly connected along the outer edge of one of the flanges 11 as shown at 13, so that the hinge will be positioned to permit of the sections being folded in the manner shown in Figure 2 of the drawings with the adjacent flanges 11 forming stop shoulders to limit relative pivotal movement of the sections in an opposite direction. The sections may thus be extended to form a platform as shown in Figure 1.

The sections 10 are provided near their outer ends with transversely spaced rollers 13, the rollers of one section being spaced inward from the adjacent end a greater distance than the rollers of the other section. The relative positions of the rollers will thus be such that when the sections are folded, the periphery of the rollers will engage. The rollers are so spaced from the under face of the platform that when the platform is folded the rollers will be past center and as they are in close contacting engagement, the said rollers will form a locking or latching means to hold the sections folded. To permit of the passage of the rollers past one another they are provided with compressible treads 14 so that the sections are yieldingly held.

By reference to Figure 2 of the drawings it will be seen that the shape of the sections is such as to provide a container in which articles may be kept, and, as the truck when folded may be carried in an automobile, it will form a convenient box like receptacle.

If desired, the sections 10 may be provided with pivotally mounted latches 15 whose outer ends are adapted to engage headed studs 16 to hold the sections folded.

One of the sections 10 may be provided with an inclined rest 16' for the head and shoulders of the user, the character of the rest being such as to relive the neck from strain. A cushion 17 may be detachably secured to the section as indicated at 18, and when not in use, may be placed within the folded container as shown in Figure 2 of the drawings.

The invention is susceptible of various changes in its form, proportions and minor details of construction and the right is herein reserved to make such changes as properly fall within the scope of the appended claims.

Having described the invention what is claimed is:—

1. A foldable truck comprising a platform formed of separate sections, hinges spaced from the upper face of the platform and connecting adjacent edges of the sections to permit of the later being folded one upon the other and provide stop shoulders to limit relative movement in an opposite direction, rollers extending from the under face of the platform sections at the ends remote from the hinges, with the rollers at one end of the platform so spaced with respect to the rollers at the opposite end of said platform to provide an interlocking engagement when the sections are folded and compressible treads for the rollers.

2. A foldable truck comprising separate hingedly connected sections, rollers to support the truck when the sections are unfolded and means included in the rollers to yieldingly hold the sections folded.

In testimony whereof I affix my signature.

WILLIAM W. BURNWATT.